Nov. 5, 1968  P. M. McPHERSON  3,409,374
OPTICAL GRATING SPECTRAL DISPERSION SYSTEMS
Filed Feb. 26, 1965
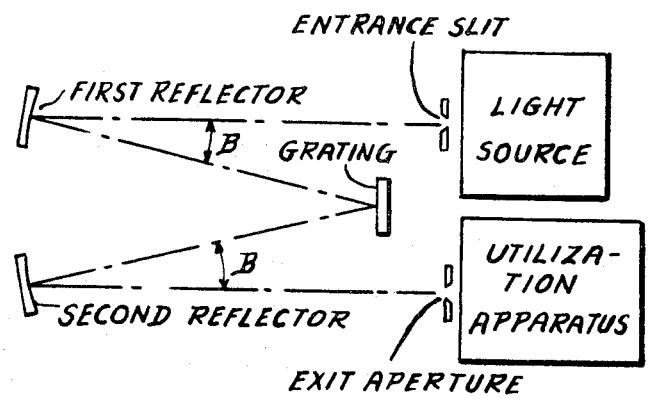
Fig. 1 - PRIOR ART
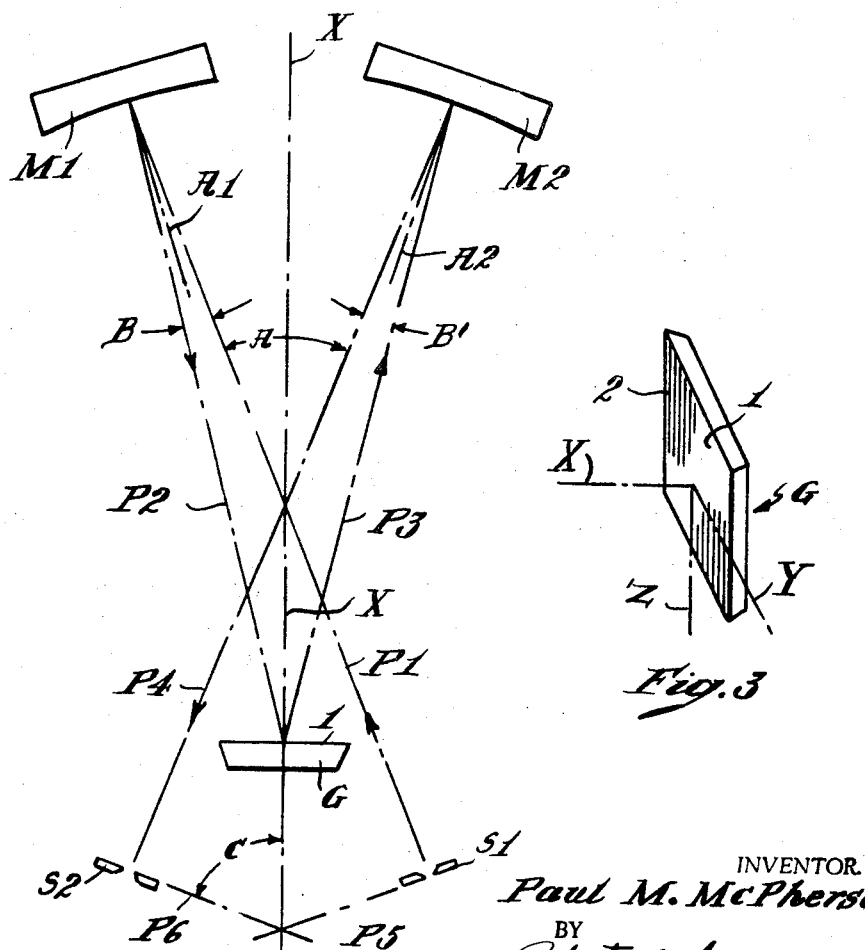
Fig. 2
Fig. 3
INVENTOR.
Paul M. McPherson
BY
Roberts, Cushman & Grover
ATT'YS

United States Patent Office 3,409,374
Patented Nov. 5, 1968

3,409,374
OPTICAL GRATING SPECTRAL
DISPERSION SYSTEMS
Paul M. McPherson, Acton, Mass., assignor, by mesne assignments, to McPherson Instrument Corporation, a corporation of Delaware
Filed Feb. 26, 1965, Ser. No. 435,511
6 Claims. (Cl. 356—99)

ABSTRACT OF THE DISCLOSURE

A spectrometer system for use in dispersing a wide range of wavelengths of light including the vacuum ultraviolet wavelengths, where the system includes a grating, two mirrors and entrance and exit slits, all symmetrically disposed with respect to a plane of symmetry running through the grating. The optical axes between the entrance slit and first reflector and between the exit slit and second reflector are crossed to permit lateral space around the slits for light sources and detectors while compensating for off axis error and maintaining a low F number for the system.

---

This invention relates to optical systems using ruled gratings to disperse ultraviolet, visible and infrared light in spectra. Typical systems include spectroscopes, spectrometers, spectrographs and monochromators. The invention is particularly concerned with systems in which the optics are reflective as compared with transmissive.

A typical reflective system, known as the Czerny-Turner system, is illustrated in FIG. 1 and comprises an entrance slit through which light enters from a suitable source, a first curved reflector which collimates light from the entrance slit and directs it to a grating, and a second curved reflector which focusses light dispersed from the grating upon an exit slit or aperture at or beyond which is apparatus for utilizing the dispersed light in a measurement or other experiment.

The grating directly reflects a central image of the entrance slit at an angle equal to the angle of incidence of the collimated light, and also disperses light in colored spectra of ascending orders to each side of the central image. These spectra are focussed by the second reflector on an arc or plane passing through the exit aperture. By rotating the grating about its vertical or Z axis parallel to the grating rulings the spectra may be swept across the exit aperture or slit so that various bands of the spectra may be selected for presentation at the exit aperture or slit.

Four primary optical criteria of such a system are speed, resolution, dispersion, and relatively small off-axis error. The speed or aperture ratio of the system, usually expressed as an $f/$ number, is the ratio of the focal length of the curved reflectors to the effective diameter of the grating. With a lower $f/$ number, and therefore a higher speed, more light energy is delivered to the exit aperture. Resolution is the ability to separate two adjacent spectral lines at the exit aperture. Dispersion refers to the extent to which the width (in angstrom units) of a spectral band is spread across a millimeter of exit aperture width. Off-axis error is an off-axis condition which produces image deterioration, such as astigmatism, when the light incident to and reflected from the first and second reflectors deviates excessively from principal axes normal to the reflectors. In FIG. 1 the off-axis deviation is one half that of the angle B between incident and reflected rays.

In the Czerny-Turner system off-axis error is largely compensated by the symmetrical arrangement of the reflectors with respect to a plane of symmetry through the center of the grating, and resolution is satisfactory for small values of angle B. However, in the Czerny-Turner system, with a grating of given size, the angle B can be kept small only by spacing reflectors of long focal length relatively far from the grating. And, as speed has been previously defined, an optical system of long focal length relative to the grating size has a slow speed. Thus it is not possible to maintain good resolution and increase the speed of a Czerny-Turner system without limit by reducing the focal length because, with a given lateral spacing between the entrance slit and exit aperture, the angle B would be increased to the extent that the image at the exit aperture would become intolerably poor. Nor is it possible to hold angle B small by decreasing the lateral spacing of the entrance slit and exit aperture because of the very practical consideration that the light source outside the entrance slit and the measuring or experimental apparatus beyond the exit aperture are usually of considerable bulk. Their bulk prohibits close spacing of the entrance slit and exit aperture, and in the Czerny-Turner system there is no way of avoiding this spacing problem without introducing an additional reflection.

While it is theoretically possible to increase the speed of the Czerny-Turner system of FIG. 1 by increasing grating and reflector size, economic considerations make such an expedient impractical. A grating four inches square costs almost three times as much as a grating two inches square. Eight inch square gratings are virtually unavailable. Moreover gratings with a high number (over 1200) of lines per millimeter, and hence high dispersion, are practical only in the smaller, two inch square size. Notwithstanding the above described limitations it is highly desirable to extend the use of three reflection systems (two reflectors and a grating) into the vacuum ultraviolet region for example, where previously their use has been practically prohibited because of the energy loss in three reflections.

The objects of the present invention are to retain the symmetry, dispersion and image forming quality of the Czerny-Turner system and at the same time to overcome its limitations by providing a fast system which at the same time allows substantially more space for accommodating the bulk of a light source and detector or other experimental apparatus, and which may be used with light in the vacuum ultraviolet as well as the near ultraviolet, visible and infrared.

According to the invention optical diffraction apparatus for spectral dispersion comprises light entrance and light exit means, a diffraction grating of predetermined width, and first and second concave reflectors disposed on an optical entrance path from the entrance means to the first reflector, thence on a path to the grating, on a path to the second reflector and on an exit path to the exit means, wherein the first reflector and exit means are on one side of a plane of symmetry through the grating and the second reflector and entrance means are on the other side of said plane whereby in a system with an optical path of given length and with a given speed the space available around the entrance and exit paths externally of said entrance and exit means is substantially increased.

For the purpose of illustration typical embodiments of the invention are shown in the accompanying drawings in which:

FIG. 1 is a schematic diagram of the above described diffraction spectral dispersion optical system known in the prior art;

FIG. 2 is a schematic diagram of an optical system according to the present invention; and FIG. 3 is an isometric view of a diffraction grating.

As shown in FIG. 2 the optical system of a monochromator according to the present invention comprises an entrance slit S1, a first concave reflector M1, a diffraction grating G, a second concave reflector M2 and an exit slit S2. The grating as shown in FIG. 3 is a rectangular glass blank having an optically finished plane face 1 on which is an aluminum coating with vertical rulings 2. The ruled face defines three mutually perpendicular axes: The X axis normal to the plane of the face 1, the Y axis lying horizontally in the plane of the face, and the Z axis extending vertically in the plane of the face parallel to the rulings 2. As is described in more detail in my copending application Ser. No. 410,915, filed Nov. 13, 1964, the grating G may be rotated about the Z axis from the rest position shown in FIG. 2. With the grating in rest position as shown the reflectors M1 and M2 and the slits S1 and S2 are substantially symmetrical with respect to a plane of symmerty passing through the X axis and normal to the plane in which FIG. 2 is drawn.

Light enters the optical system through the entrance slit S1 along an entrance path P1 normal to a plane P5 through the slit to the first reflector M1 at an angle ½ B off the principal axis A1 of the first reflector. The first reflector collimates the light and directs it along a path P2 to the grating G at an angle ½ B off the axis A1. The grating diffracts the collimated light in dispersed spectra whose central image is on a path P3 to the second reflector M2 when the grating is in rest position. Whatever the position of the grating, light will be dispersed to the second reflector M2 generally at an angle ½ B' off the axis A2 of the second reflector and will be focussed by the second reflector in an arc tangent to or in a plane coincident with a plane P6 through the exit slit S2. The light useful for transmission through the exit slit S2 or other exit aperture will pass along an exit path P4 at an angle ½ B' off the axis A2.

According to the present invention the first reflector M1 and the exit slit S2 are on one side of the plane of symmetry through the X axis of the grating G, while the second reflector M2 and entrance slit S1 are on the other side of the plane of symmetry. The reflectors M1 and M2 are so inclined with respect to the plane of symmetry through the grating G that the entrance path P1 and the exit path P4 intersect the plane and each other between the reflectors and the grating and diverge on opposite sides of the grating.

A substantial advantage is provided by inclining the plane P5 through the entrance slit and the plane P6 through the exit slit with respect to the plane of symmetry through the grating. The light source outside the entrance slit S1 is given angular clearance from the light detector or other utilization apparatus outside the exit slit or aperture S2, and the work space increases away from the entrance slit and exit aperture.

With the new optical system described, a grating two inches square, ruled 2400 lines per millimeter, may be used with reflectors of twelve inch focal length providing a system with a speed of $f/5.3$, a dispersion of 13.3 angstroms per millimeter, a resolution down to 0.2 angstrom using 10 micron slits, and a substantially greater angular clearance for the external light source and utilization apparatus. Yet the off-axis deviation, half the angle B or B' in FIG. 2, is held to approximately 4°, with an angle A between the entrance path P1 and the exit path P4 of 44°, and an angle C of 68° between the plane of symmetry through the grating and either plane P5 or P6.

With a system according to the invention the $f/5.3$ speed system described above can accommodate a light source approximately 5 inches in width at the entrance slit and a light detector approximately 5 inches in width at the exit slit. Apparatus of such size could not be accommodated outside a prior art system with the same speed and size of grating without increasing the angle B and the consequent image distortion.

Thus the present system can be made as small and as fast as possible and yet provide substantially more space for accommodating the bulk of the external equipment conventionally used wtih systems of the general type. And the present system will retain the same resolution, dispersion and freedom from off-axis error as a prior system of the same speed and grating size.

Further according to the present invention the concave surfaces of the reflectors are paraboloid, that is, generated by the revolution of a parabola around its axis. In the example given the paraboloid reflectors have a focal length of twelve inches and are approximately 3 inch square portions taken from each side of the vertex of the paraboloid. In the present system of minimum focal length and maximum speed, such reflectors collimate the light directed to the grating and focus the spectra on the exit slit or aperture most closely to perfection.

It should be understood that this invention is for illustration only and includes all modifications and equivalents which fall within the scope of the appended claims. For example, spherical or other reflectors of the same focal length as the paraboloid reflectors described may be used in their place.

I claim:

1. Optical diffraction apparatus for spectral dispersion comprising,
   light entrance and light exit means,
   a diffraction grating of predetermined width,
   a reflection system including first and second concave reflectors for producing no more than two reflections, said reflection system including an entrance means, an exit means and, in sequence an optical path from the entrance means to the first reflector, a path from the first reflector to the grating, a path from the grating to the second reflector and a path from the second reflector to the exit means, wherein the first reflector and exit means are on one side of a plane of symmetry through the grating and the second reflector and entrance means are on the other side of said plane, whereby in a system with an optical path of given length and with a given speed the space available around the entrance and exit paths externally of said entrance and exit means is substantially increased.

2. Apparatus according to claim 1 wherein the principal axes of said reflectors cross between the reflectors and said grating.

3. Apparatus according to claim 1 wherein the planes of the entrance and exit means are inclined with respect to said plane of symmetry.

4. Apparatus according to claim 1 wherein at least one of said reflectors has a parabolic curvature.

5. Apparatus according to claim 1 wherein both said reflectors have a parabolic curvature.

6. Apparatus according to claim 3 wherein axes normal to said planes of, and passing through, the entrance and exit means intersect between the grating and said reflectors.

References Cited

UNITED STATES PATENTS 3,048,080    8/1962    White _____ 88—14

OTHER REFERENCES

A. M. Vergnoux et C. Deloupy: "Revue d'Optique," vol. 36, No. I, January 1957, pp. 22–31.

JEWELL H. PEDERSEN, *Primary Examiner.*

V. P. McGRAW, *Assistant Examiner.*